June 23, 1936.  E. C. LONG  2,044,854
PISTON
Filed Jan. 17, 1921
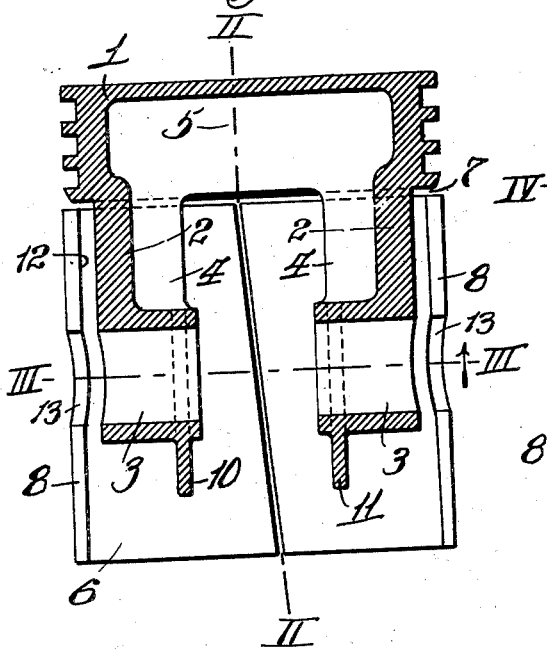
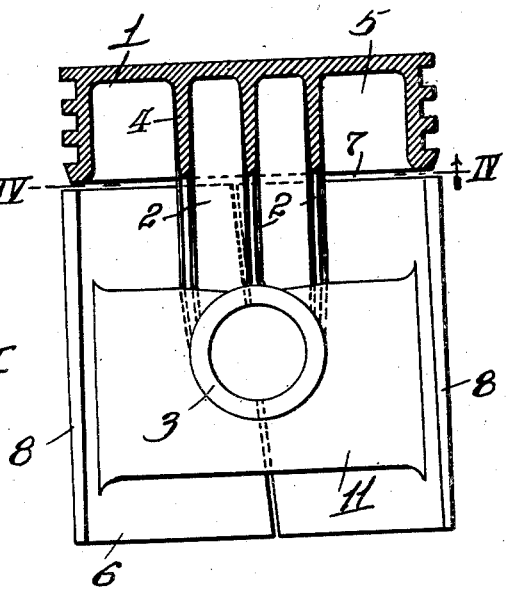
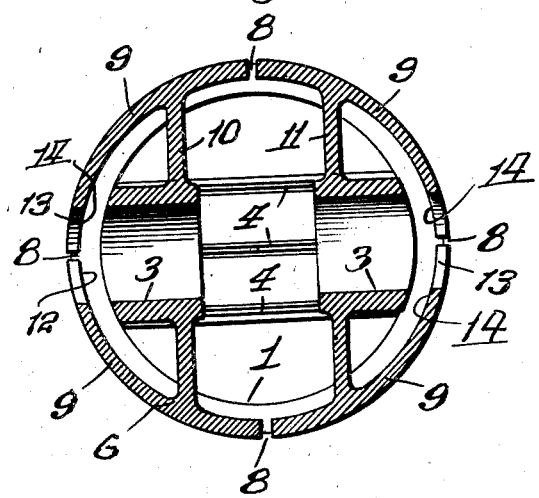
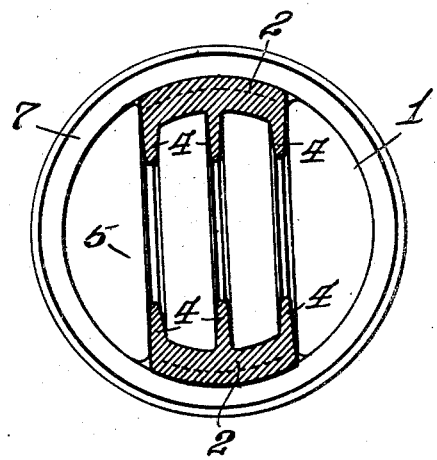
Inventor:
Elmer C. Long.
By H. G. Fletcher
Atty.

Patented June 23, 1936

2,044,854

UNITED STATES PATENT OFFICE 2,044,854

PISTON

Elmer C. Long, Quincy, Ill., assignor, by mesne assignments, to Security Trust Company, Detroit, Mich., a corporation of Michigan Application January 17, 1921, Serial No. 437,690

9 Claims. (Cl. 309—11)

The primary object of this invention is to provide an improved piston for use in internal combustion motors.

Another object of the invention is to provide a piston with an improved construction of skirt.

A further object is to provide an improved manner of sustaining the skirt of the piston from the closed or packing ring bearing end.

A still further object of the invention is to provide improved means in a piston for supporting the wrist pin bearings.

Other and further objects will appear in the specification and be specifically pointed out in the appended claims, reference being had to the accompanying drawing exemplifying the invention, and in which Fig. 1 is a vertical section taken through this improved piston.

Fig. 2 is a vertical section taken approximately on the line II—II of Fig. 1.

Fig. 3 is an inverted horizontal section taken on the line III—III of Fig. 1.

Fig. 4 is an inverted horizontal section taken on the line IV—IV of Fig. 2.

With reference to the drawing this improved piston comprises a closed end portion 1 which is adapted to cooperate within the firing chamber of an internal combustion motor, and depending from said end portion are a pair of diametrically opposing supporting arms 2, each being for the support of a respective wrist pin bearing 3; and for providing reinforcement to said arms and said bearings are a plurality of ribs 4 which extend from said bearings, upwardly to within the hollow portion 5 of the end portion 1, and across said hollow portion.

The skirt 6 of this improved piston is separated from the end portion 1 of the piston by the transverse annular slot 7, said skirt having a plurality of longitudinally inclining slots 8, for providing a plurality of separated skirt-portions 9. Extending transversely across and within the skirt 6 is a pair of webs intermediate their ends 10 and 11, said webs being formed integral with respective wrist pin bearings 3. The extending ends of the web 10 are each formed integral with respective skirt portions 9 of an opposing pair of skirt portions, and the extending ends of the web 11 are each formed integral with respective skirt portions of another opposing pair of skirt portions 9.

In Fig. 1, it is to be noted that the arms 2 of the wrist pin bearings 3 are disposed inwardly of the inner periphery 12 of the skirt 6, said arms supporting the webs 10 and 11 and the skirt portions 9 which are carried by said webs, and as the arms 2 are integral with the closed end 1 of the piston, a rigid and solid support is provided for the wrist pin bearings, through said arms, while a resilient support is provided for the skirt portions 9, through the webs 10 and 11.

In Fig. 3, it will be noted that the wall of the piston skirt 6 is made thinner adjacent each of the wrist pin bearings 3. This is for the purpose of allowing the skirt to more readily yield to the cylinder wall of a motor, so that but a minimum of friction may develop between the cylinder wall and the skirt when the piston is expanded.

In the operation of this improved piston, as the closed end or head 1 is subjected to the intense heat of the firing chamber in an internal combustion motor cylinder, the ribs 4 which depend from the closed end 1 of the wrist pin bearings 3, will provide for a maximum of heat radiation and consequently, the piston skirt will at no time receive the degree of heat given to the closed end 1, and as the piston skirt 6 is of a plurality of separated sections 9, a resiliently yielding fit will be provided at all times between the piston skirt and the cylinder wall.

For mounting a wrist pin in the bearings 3, opposing openings 13 are provided in the skirt 6 in alinement with said bearings.

From an inspection of Fig. 3 it will be noted that the wall of the skirt 6 of the piston is made thinner adjacent each of the wrist pin bearings 3. This is for the purpose of allowing the wall of the skirt of the piston to yield more readily to the cylinder, so that a minimum degree of friction will be given to the cylinder wall and piston skirt when the skirt is under expansion.

I claim:

1. A piston comprising a solid end portion having a pair of wrist pin bearings depended therefrom, a skirt portion, said skirt portion having an annular slot cut through the thickness of its peripheral wall thereby separating it from said solid end portion, said wrist pin bearings being free from engagement with said skirt portion, the wall of said skirt portion being circumferentially tapered to decreasing thickness toward opposing sides and provided with a pair of slots in the thinner sides thereof which extend longitudinally from the lower end thereof to said annular slot, said skirt portion being supported from the wrist pin bearings by webs engaging the thicker sections of the skirt.

2. A piston provided with an annular cutting through the thickess of its peripheral wall thereby providing a separated skirt, said skirt having a longitudinally extending portion of its wall circumferentially tapered to decreasing thickness and supported from its thicker portion, said skirt being provided with a slot extending through said thin portion thereof from the lower end of the piston to said annular cutting, said slot being cut entirely through the thickness of said thin portion of the skirt.

3. A piston for an internal combustion engine comprising an integral head and skirt, cylinder engaging bearing walls in the skirt, and a yieldable portion in one of the said bearing walls varying in wall thickness in the direction of its circumferential length from a maximum at its point of support to a minimum at its free end.

4. A piston for an internal combustion engine comprising a head and a skirt, the skirt having a plurality of flexible circumferentially extending portions varying uniformly in wall thickness in the direction of their free ends.

5. A piston for an internal combustion engine comprising a head, a skirt separated from the head, and pin bosses supported from the head, the skirt being circumferentially tapered to decreasing thickness toward the pin boss sides, slotted longitudinally in the thinner portions, and supported from the thicker portions thereof at the thrust sides of the piston.

6. A piston for an internal combustion engine comprising a head and a skirt separated from the head, the skirt having thrust sides and pin boss sides, and being longitudinally slotted in a pin boss side, at least one part of the skirt being tapered to increasing thickness from the slotted pin boss side toward a thrust side.

7. A piston for an internal combustion engine comprising a head, a skirt separated from the head, and pin bosses separated from the skirt depended from the head, the skirt being supported from the pin bosses and longitudinally slotted, the skirt sections between the supports and slots tapering circumferentially from a maximum at their supports to decreased thickness at the slots.

8. A piston for an internal combustion engine comprising a head, pin bosses depending therefrom, and a skirt supported from the pin bosses and separated from the head, the skirt having a plurality of flexible sections separated by slots and circumferentially tapering to decreased wall thickness from a maximum at their points of support.

9. A piston for an internal combustion engine comprising a head, pin bosses depending therefrom, and a skirt supported from the pin bosses and separated from the head, the skirt being divided by slots into a plurality of flexible sections, at least one of said skirt sections tapered to decreased wall thickness in the direction of its circumferential length, from a maximum at the point of support.

ELMER C. LONG.